(12) United States Patent
Whitted (10) Patent No.: US 10,123,632 B2
(45) Date of Patent: Nov. 13, 2018

(54) MULTIFUNCTIONAL PORTABLE SEAT COVER KIT

(71) Applicant: Sandra Whitted, Homewood, IL (US)

(72) Inventor: Sandra Whitted, Homewood, IL (US)

( * ) Notice: Subject to any disclaimer, the term of this patent is extended or adjusted under 35 U.S.C. 154(b) by 210 days.

(21) Appl. No.: 15/092,247

(22) Filed: Apr. 6, 2016

(65) Prior Publication Data

US 2017/0290441 A1 Oct. 12, 2017

(51) Int. Cl.
*A47C 31/11* (2006.01)
*A47C 7/62* (2006.01)
*B64D 11/06* (2006.01)
*A47C 1/02* (2006.01)
*A47C 1/12* (2006.01)

(52) U.S. Cl.
CPC ............ *A47C 31/11* (2013.01); *A47C 1/02* (2013.01); *A47C 1/12* (2013.01); *A47C 7/62* (2013.01); *B64D 11/0636* (2014.12)

(58) Field of Classification Search
None
See application file for complete search history.

(56) References Cited

U.S. PATENT DOCUMENTS

| | | | |
|---|---|---|---|
| 4,190,918 A | 3/1980 | Harvell | |
| 4,597,605 A * | 7/1986 | Gilbert | A47C 7/425 297/183.5 |
| 4,871,210 A * | 10/1989 | Alexander | A47D 1/002 297/254 |
| 5,516,193 A * | 5/1996 | Simpson | A47C 1/16 297/188.01 |
| 5,573,288 A * | 11/1996 | Raffensperger | A47C 1/16 297/188.1 |
| 5,641,199 A | 6/1997 | Bond-Madsen | |
| 6,079,599 A | 6/2000 | Nordstrom et al. | |
| 6,244,481 B1 | 6/2001 | Brougher | |
| 6,588,840 B1 * | 7/2003 | Lombardo | A47C 1/16 297/188.08 |
| 6,626,491 B1 * | 9/2003 | Biome | A45F 4/08 297/188.2 |
| 6,848,746 B2 * | 2/2005 | Gentry | A47C 7/748 297/180.11 |
| 7,374,240 B2 * | 5/2008 | Gold | A47C 31/11 297/188.01 |
| 7,517,013 B1 * | 4/2009 | Lowe | A47C 7/742 297/180.11 |

(Continued)

*Primary Examiner* — David E Allred (57) ABSTRACT

A multifunctional portable seat cover kit includes a multifunctional portable seat cover (MPSC) and a drawstring carry case. The MPSC includes a first and second section, a compartment, and a flap. The first section includes a top and bottom surface. The top surface of the first section contacts a user contact surface and the bottom surface secures the MPSC to a top area of a seat. The second section flexibly extends from the first section. The second section includes a top and bottom surface. The top surface of the second section contacts the user contact surface and the bottom surface of the second section contacts the seat. The compartment is positioned on the bottom surface of the second section and houses a pillow and pouches for storing primary objects. The flap extends from the second section and seals the compartment. The drawstring carry case stores the MPSC and secondary objects.

6 Claims, 10 Drawing Sheets

(56) References Cited

U.S. PATENT DOCUMENTS

| | | | | |
|---|---|---|---|---|
| 8,123,090 B2* | 2/2012 | Missick | ............... | A45F 4/02 |
| | | | | 224/153 |
| 8,534,755 B2* | 9/2013 | Nickerson | ............ | A45F 4/02 |
| | | | | 297/217.1 |
| 8,678,418 B1* | 3/2014 | Quarles | ............. | A47C 31/11 |
| | | | | 280/304.1 |
| 8,870,283 B2* | 10/2014 | Daley | ............ | B60N 2/5816 |
| | | | | 297/219.1 |
| 2007/0084891 A1 | 4/2007 | Gillespie | | |
| 2009/0090751 A1 | 4/2009 | D'Alessandro | | |
| 2014/0191544 A1* | 7/2014 | Comber, V | ......... | A47D 1/10 |
| | | | | 297/224 |
| 2015/0061332 A1* | 3/2015 | Dowell | ............ | A47C 7/383 |
| | | | | 297/188.01 |

\* cited by examiner

MULTIFUNCTIONAL PORTABLE SEAT COVER KIT

FIELD OF THE INVENTION

The invention disclosed herein generally relates to portable seat covers. More particularly, the invention disclosed herein relates to portable seat covers which are usable as a bag and a pillow.

BACKGROUND

Sporting events attract people of all ages across the world. While television and radio communication offers some insight into various aspects of the sport, nothing compares to actual attendance to experience the passion a sport commands. The chants and fanfare of supporters in a stadium is a sight to behold. Typically spectators are seated on rows of outdoor bleachers for the entire duration of a game. More often than not, the bleacher bench seats are hard and lack padding or are semi padded. Although youngsters may have no trouble sitting on these seats, older spectators may find it hard to comfortably sit through an entire game. Furthermore, some stadiums may have individual seats instead of benches. Due to prolonged use, most seats may be dirty. A padded seat cover which can be used to adjustably cover different types and makes of seats is required.

Typically seat covers that are used to cover bleacher bench seats or individual seats become dirty over time due to repeated use. Conventional seat covers are not washable which result in shorter life and more wear and tear of the seat cover. A portable seat cover that is machine washable and reusable is thus required. Additionally, spectators may require snacks, electronic devices, for example smartphones, power banks, music players, etc. Some contemporary seat covers can be also used as bags, however, lack secure compartments for storing multiple objects or valuables. A portable seat cover which is convertible to a bag having multiple secure compartments is required. Hence, there is a long felt but unresolved need for a padded seat cover which can be used to adjustably cover different types and makes of seats. Furthermore, there is a need for a portable seat cover that is machine washable and reusable. Moreover, there is a need for a portable seat cover which is convertible to a bag having multiple secure compartments.

SUMMARY OF THE INVENTION

This summary is provided to introduce a selection of concepts in a simplified form that are further disclosed in the detailed description of the invention. This summary is not intended to identify key or essential inventive concepts of the claimed subject matter, nor is it intended for determining the scope of the claimed subject matter.

The disclosed herein addresses the above mentioned need for a padded seat cover which can be used to adjustably cover different types and makes of seats. Furthermore, the invention addresses the need for a portable seat cover that is machine washable and reusable. Moreover, the invention disclosed herein addresses the need for a portable seat cover which is convertible to a bag having multiple secure compartments. The multifunctional portable seat cover kit comprises a multifunctional portable seat cover and a drawstring carry case. The multifunctional portable seat cover comprises a first section, a second section, a compartment, and a flap. The first section comprises a top surface and a bottom surface. The top surface of the first section is in contact with a user contact surface, for example, a back of a user. The bottom surface is configured to secure the multifunctional portable seat cover to a top area of a seat. The second section flexibly extends from the first section of the multifunctional portable seat cover. The second section comprises a top surface and a bottom surface. The top surface of the second section is in contact with the user contact surface, for example, the thighs of a user. The bottom surface of the second section is in contact with the seat.

The compartment is positioned on the bottom surface of the second section of the multifunctional portable seat cover. The compartment houses a pillow and one or more pouches for storing a plurality of primary objects. The flap extends from the second section and configured to seal the compartment. The drawstring carry case stores the multifunctional portable seat cover and a plurality of secondary objects. The multifunctional portable seat cover forms a bleacher cushion when the first section is folded and inserted into the compartment of the multifunctional portable seat cover. The multifunctional portable seat cover forms a neck pillow when the pillow in the compartment of the multifunctional portable seat cover is rolled together with the first section and the second section of the multifunctional portable seat cover stored in the drawstring carry case.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION OF THE INVENTION

Figure 1A:
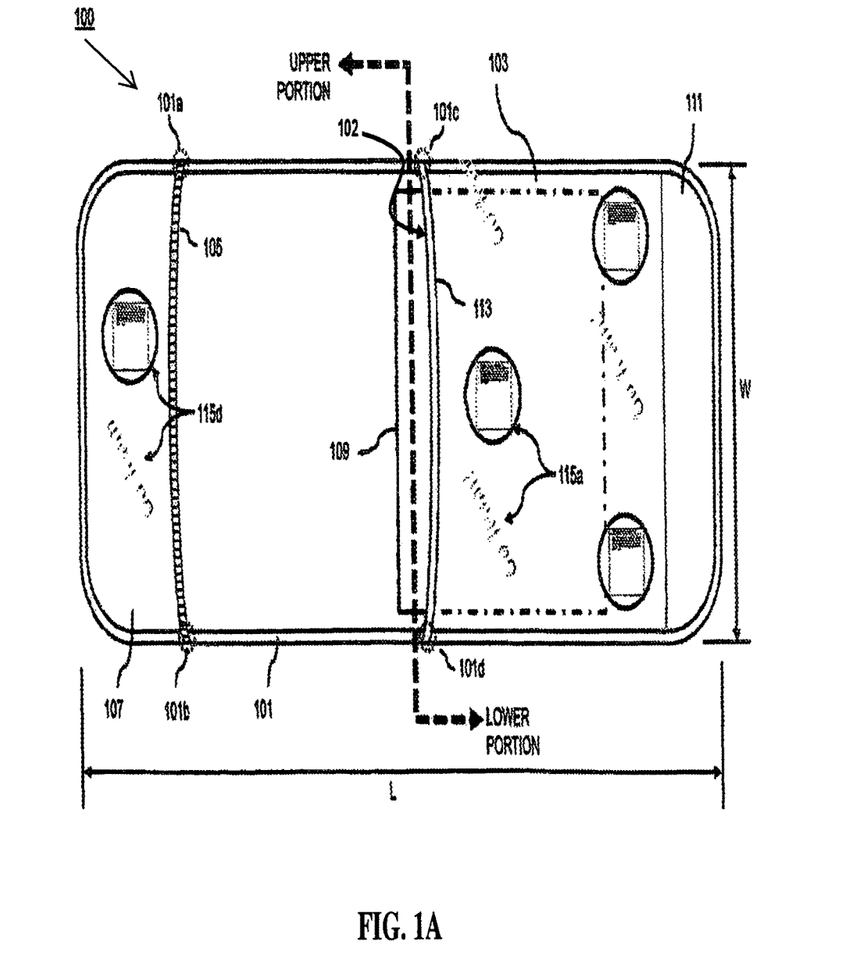
FIG. 1A exemplarily illustrates a bottom plan view of a multifunctional portable seat cover.
Figure 1B:
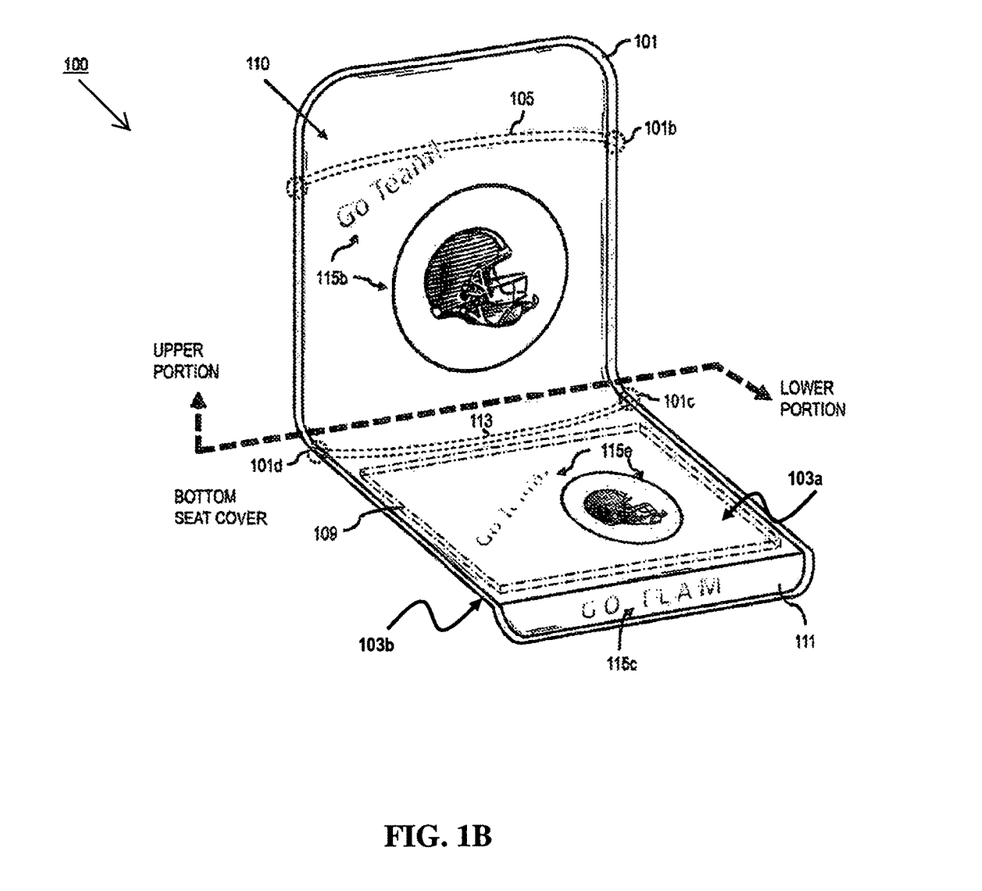
FIG. 1B exemplarily illustrates a top perspective view of a multifunctional portable seat cover.

FIG. 1A exemplarily illustrates a bottom plan view of a multifunctional portable seat cover 100. FIG. 1B exemplarily illustrates a top perspective view of a multifunctional portable seat cover 100. The multifunctional portable seat cover 100 comprises a first section 101, a second section 103, a compartment 102, and a flap 111. The first section 101 comprises a top surface 110 and a bottom surface 107 as exemplarily illustrated in FIGS. 1A-1B. The top surface 110 of the first section 101 is in contact with a user contact surface, for example, a back of a user. The second section 103 flexibly extends from the first section 101 of the multifunctional portable seat cover 100. The second section 103 comprises a top surface 103a and a bottom surface 103b as exemplarily illustrated in FIG. 1B. The top surface 103a of the second section 103 is in contact with the user contact surface, for example, the thighs of a user. The bottom surface 103b of the second section 103 is in contact with the seat 200 as exemplarily illustrated in FIGS. 2A-2B.

Figure 2A:
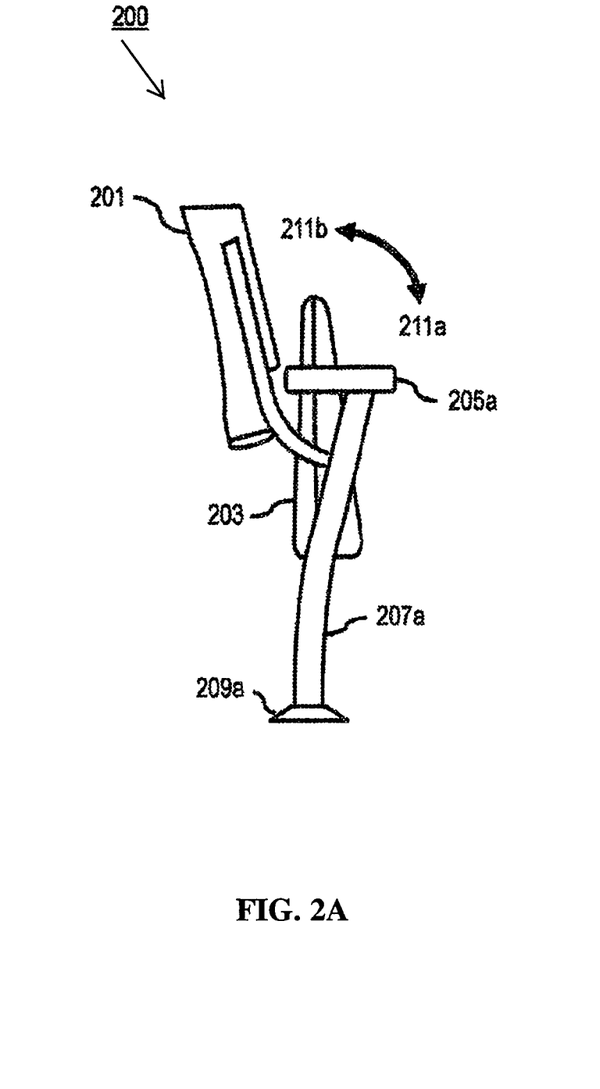
FIG. 2A exemplarily illustrates a left side view of a seat showing the seat in a closed position.
Figure 2B:
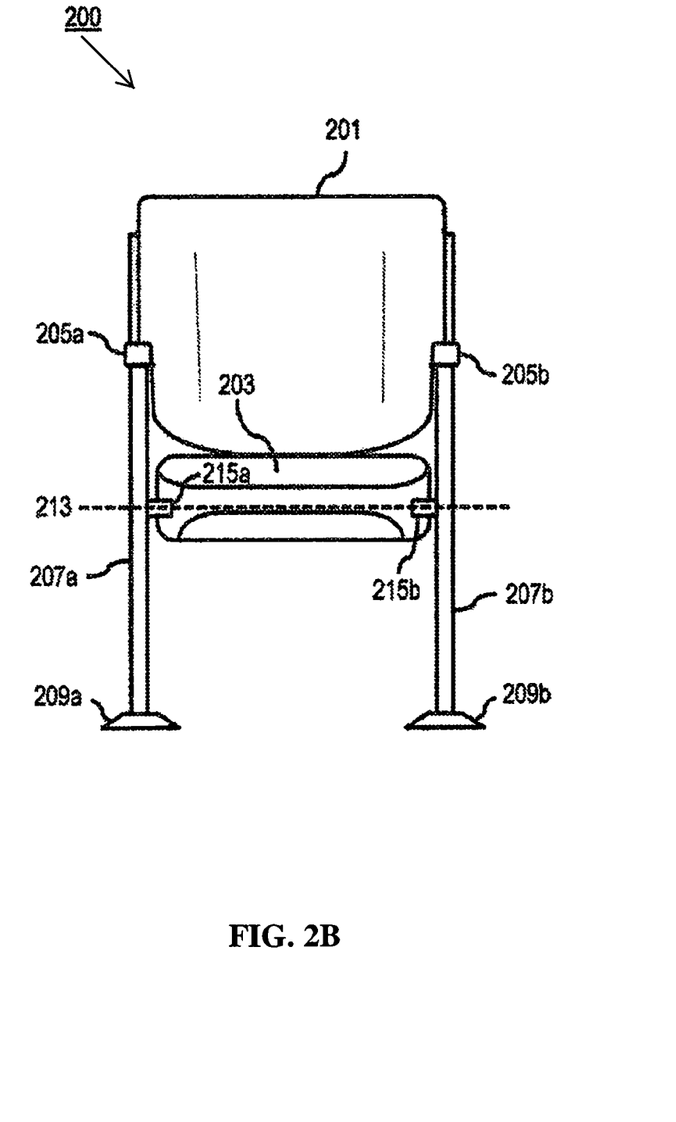
FIG. 2B exemplarily illustrate a front elevation view of a seat showing the seat in an open position.

The compartment 102 is positioned on the bottom surface 103a of the second section 103 of the multifunctional portable seat cover 100. The compartment 102 houses a pillow 109 and one or more pouches for storing a plurality of primary objects. The flap 111 extends from the second section 103 and is configured to seal the compartment. In an embodiment, a hook and loop fastener, for example, Velcro® of Velcro Industries B.V. LLC is used to fasten the flap 111 of the multifunctional portable seat cover 100. Hook and loop fasteners are the only fasteners used in the multifunctional portable seat cover 100 and they also seal the pouches of the compartment 102. In an embodiment, a top strap 105 is fixedly attached to the two ends 101a and 101b of the first section 101. The central strap 113 is fixedly attached at two ends 101c and 101d of the bottom surface 103b of the second section 103 for securing the multifunctional portable seat cover 100 to the seat. The pillow 109 is inserted into the compartment 102 and provides padded support to the user for additional comfort. The pillow 109 is removable and machine washable. This feature enables the pillow 109 to be used multiple times and prolongs the life of the multifunctional portable seat cover 100. In an embodiment, several logos and captions 115a, 115b, 115c, 115d, 115e are inscribed on the first section 101, the second section 103, and the flap 111 as exemplarily illustrated in FIGS. 1A-1B. In an embodiment, the logos and captions 115a, 115b, 115c, 115d, 115e of the multifunctional portable seat cover 100 are customizable, for example, multiple team logo options, color options, captions, etc. The multifunctional portable seat cover 100 is used, for example, for various sporting events, school events, fundraisers, advertisements, cheerleading banners, etc. In an embodiment, the interior of the compartment 102 comprises multiple pouches for storing primary objects, for example, valuables, money, FIG. 2A exemplarily illustrates a left side view of a seat 200 showing the seat 200 in a closed position 211b. FIG. 2B exemplarily illustrate a front elevation view of a seat 200 showing the seat 200 in an open position 211a. The seat 200 comprises a backrest 201, a seating member 203, armrests 205a and 205b, frame members 207a and 207b, leg caps 209a and 209b, and hinged joints 215a and 215b. In an embodiment, the seat 200 is, for example, an airline seat, a recliner, an office chair, a movie theater seat, a stadium seat, etc. The seating member 203 is hinged about the frame members 207a and 207b. This enables the seating member 203 to be folded from an open position 211a to a closed position 211b as exemplarily illustrated in FIG. 2A.

Figure 3A:
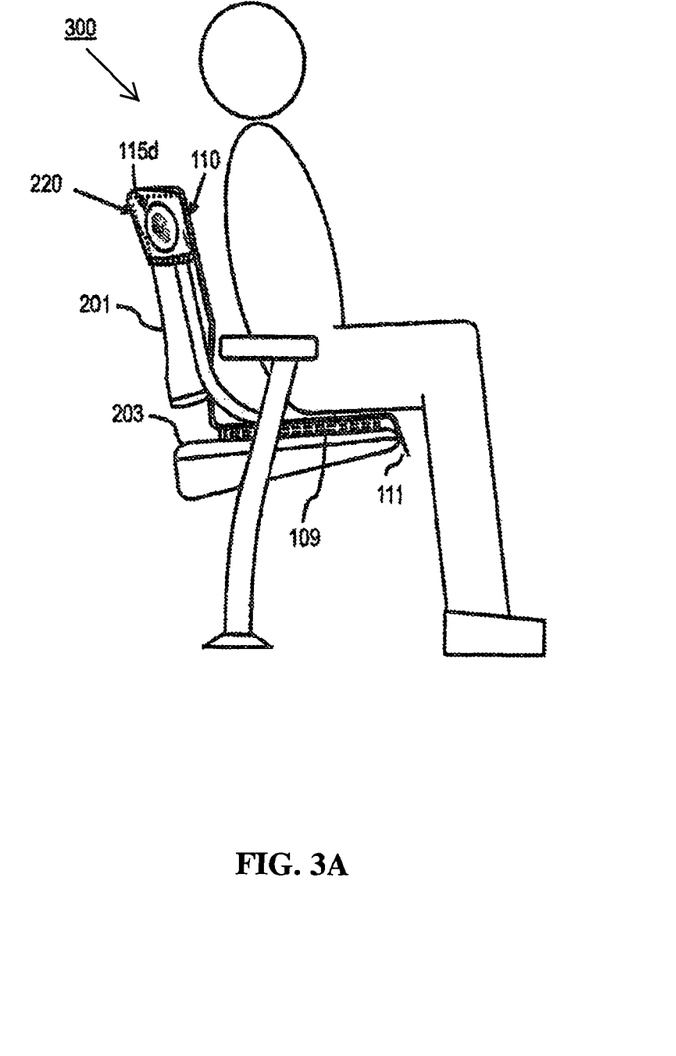
FIG. 3A exemplarily illustrates a left side view of a multifunctional portable seat cover applied to a seat showing a user seated on the seat.
Figure 3B:
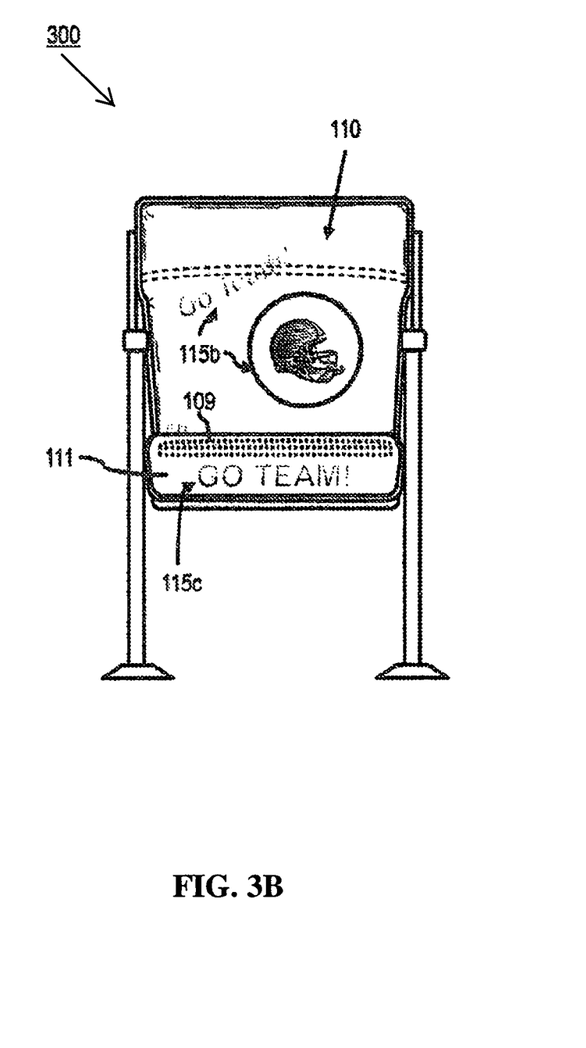
FIG. 3B exemplarily illustrates a front elevation view of a multifunctional portable seat cover applied to a seat.

FIG. 3A exemplarily illustrates a left side view of a multifunctional portable seat cover 100 applied to a seat 200 showing a user seated on the seat. FIG. 3B exemplarily illustrates a front elevation view of a multifunctional portable seat cover 100 applied to the seat 200. The bottom surface 107 of the first section 101 is configured, for example, as a hood to secure the multifunctional portable seat cover 100 to a top area 220 of a seat 200. The leg portion of the user is positioned on the top surface 103a of the second section 103. In an embodiment, logos and captions 115b and 115c are inscribed on the top surface 110 of the first section 101 and the flap 111 respectively as exemplarily illustrated in FIG. 3B.

Figure 4A:
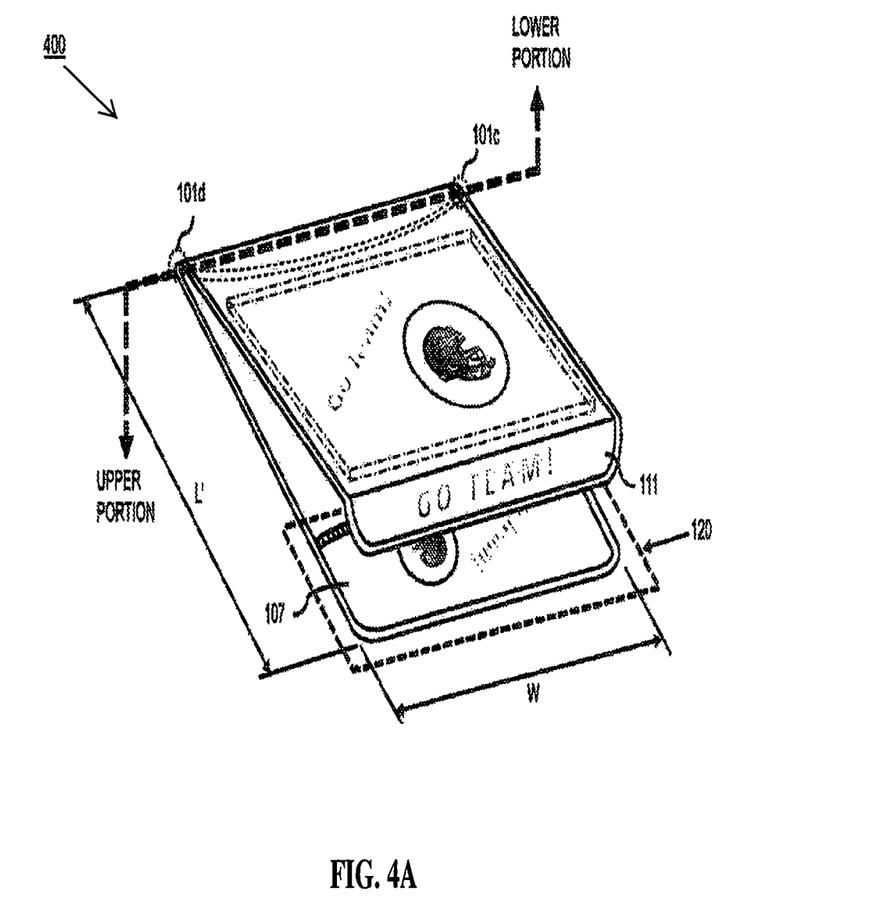
FIG. 4A exemplarily illustrates a top perspective view of a multifunctional portable seat cover being folded.
Figure 4B:
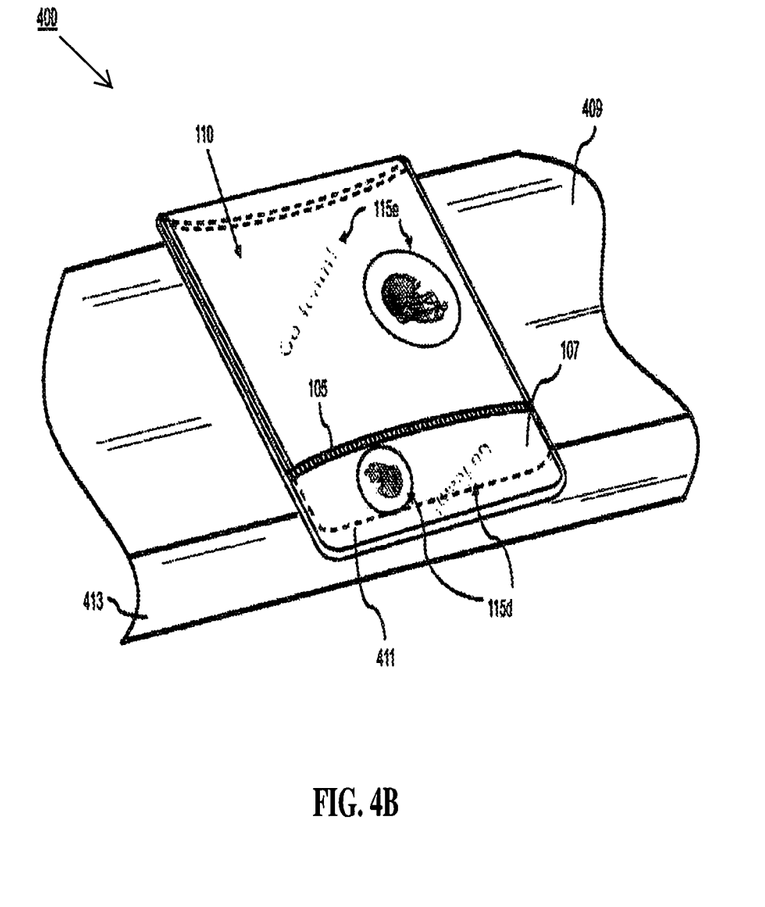
FIG. 4B exemplarily illustrates a top perspective view of a multifunctional portable seat cover folded and used as a bleacher cushion.

FIG. 4A exemplarily illustrates a top perspective view of a multifunctional portable seat cover 100 being folded. FIG. 4B exemplarily illustrates a top perspective view of a multifunctional portable seat cover 100 folded and used as a bleacher cushion. Consider a scenario in which the seat 200 exemplarily illustrated in FIGS. 2A-2B is replaced by a bench 400 as exemplarily illustrated in FIG. 4B. In such a scenario, a user may wish to use the multifunctional portable seat cover 100 as a bleacher cushion. The user folds the multifunctional portable seat cover 100 in a way that the flap 111 extending from the second section 103 is inserted into a space 120 between the top strap 105 and the bottom surface 107 of the first section 101. The multifunctional portable seat cover 100 thus operates as a bleacher cushion and extends from the top surface 409 of the bench 400 to the curved edge 413 of the bench. The flap 111 extends from the edge 411 of the bench 400 as exemplarily illustrated in FIG. 4B.

Figure 5A:
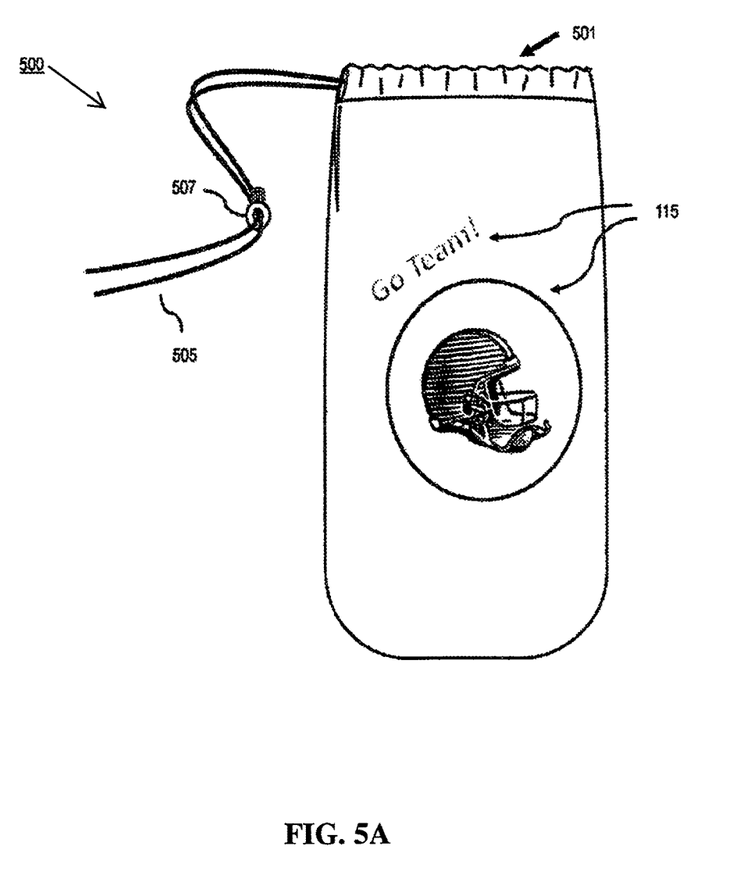
FIG. 5A exemplarily illustrates a drawstring carry case.
Figure 5B:
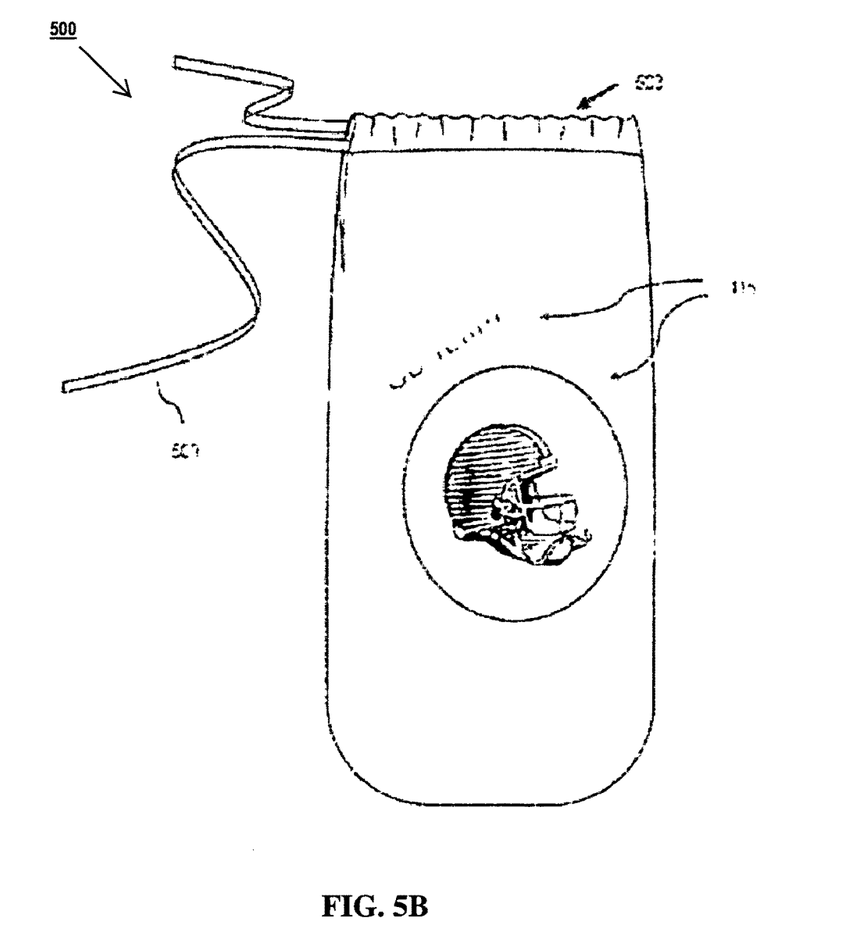
FIG. 5B exemplarily illustrates a drawstring carry case.

FIG. 5A-5B exemplarily illustrates a drawstring carry case 500. The drawstring carry case 500 stores the multifunctional portable seat cover 100 and a plurality of secondary objects. The drawstring carry case 500 is a standalone drawstring back pack that can carry items along with the multifunctional portable seat cover 100. With the pillow 109 rolled inside it becomes a neck roll. In an embodiment, the drawstring carry case comprises a seam 501, a cord 505, and a cord lock 507 as exemplarily illustrated in FIG. 5A. When the cord lock 507 is moved along the cord 505 closer to the seam 501, the drawstring carry case 500 is in a closed condition. When the cord lock 507 is moved along the cord 505 away from the seam 501, the drawstring carry case 500 is in an open condition. In another embodiment, the drawstring carry case 500 comprises a string 509 instead of a cord 505. The string 509 is passed through a seam 503 as exemplarily illustrated in FIG. 5B. The string 509 is made into a knot to close the drawstring carry case 500.

The foregoing examples have been provided merely for the purpose of explanation and are in no way to be construed as limiting of the multifunctional portable seat cover 100 and kit disclosed herein. While the multifunctional portable seat cover 100 and kit has been described with reference to various embodiments, it is understood that the words, which have been used herein, are words of description and illustration, rather than words of limitation. Further, although the multifunctional portable seat cover 100 and kit has been described herein with reference to particular means, materials, and embodiments, the multifunctional portable seat cover 100 and kit is not intended to be limited to the particulars disclosed herein; rather, the multifunctional portable seat cover 100 and kit extends to all functionally equivalent structures, methods and uses, such as are within the scope of the appended claims. Those skilled in the art, having the benefit of the teachings of this specification, may effect numerous modifications thereto and changes may be made without departing from the scope and spirit of the multifunctional portable seat cover 100 and kit disclosed herein in their aspects.

What is claimed is:
1. A multifunctional portable seat cover kit comprising:
a multifunctional portable seat cover comprising:
a first section comprising a top surface and a bottom surface, the top surface of the first section is adapted to be in contact with a user contact surface, the bottom surface configured to secure the multifunctional portable seat cover to a top area of a seat by a top strap having ends fixedly attached at respective ends of the first section and forming a closed loop defining a space between the top strap and the bottom surface of the first section;

a second section flexibly extending from the first section of the multifunctional portable seat cover, the second section comprising a top surface and a bottom surface, wherein the top surface of the second section is adapted to be in contact with the user contact surface, and wherein the bottom surface of the second section is in contact with the seat;

a compartment positioned on the bottom surface of the second section of the multifunctional portable seat cover, the compartment housing a pillow; and a flap extending from the second section;

a drawstring carry case for storing the multifunctional portable seat cover and a plurality of secondary objects;

wherein the multifunctional portable seat cover forms a bleacher cushion with the second section folded and inserted into the bottom surface of the first section with the flap extending into the space between the top strap and the bottom surface of the first section; and whereby the multifunctional portable seat cover forms a neck pillow when the pillow in the compartment of the multifunctional portable seat cover is rolled together with the first section and the second section of the multifunctional portable seat cover stored in the drawstring carry case.

2. The multifunctional portable seat cover kit of claim 1, further comprising a plurality of straps including the top strap, positioned on the bottom surface of the first section and the second section, the straps fixedly attached to the bottom surface of the first section and the second section of the multifunctional portable seat cover for securing the multifunctional portable seat cover to the seat.

3. The multifunctional portable seat cover kit of claim 1, wherein the first section and the second section of the multifunctional portable seat cover is customized to form a cheering banner.

4. The multifunctional portable seat cover kit of claim 1, wherein a plurality of logos are inscribed on one or more of the first section and the second section.

5. The multifunctional portable seat cover kit of claim 1, wherein the seat is one or more of an airline seat, a recliner, an office chair, a movie theater seat, and a stadium seat.

6. The multifunctional portable seat cover kit of claim 1, wherein the multifunctional portable seat cover is washable and reusable.

* * * * *